Aug. 9, 1966 A. L. WELLFORD 3,265,953
STATIC INVERTER
Filed Oct. 26, 1962
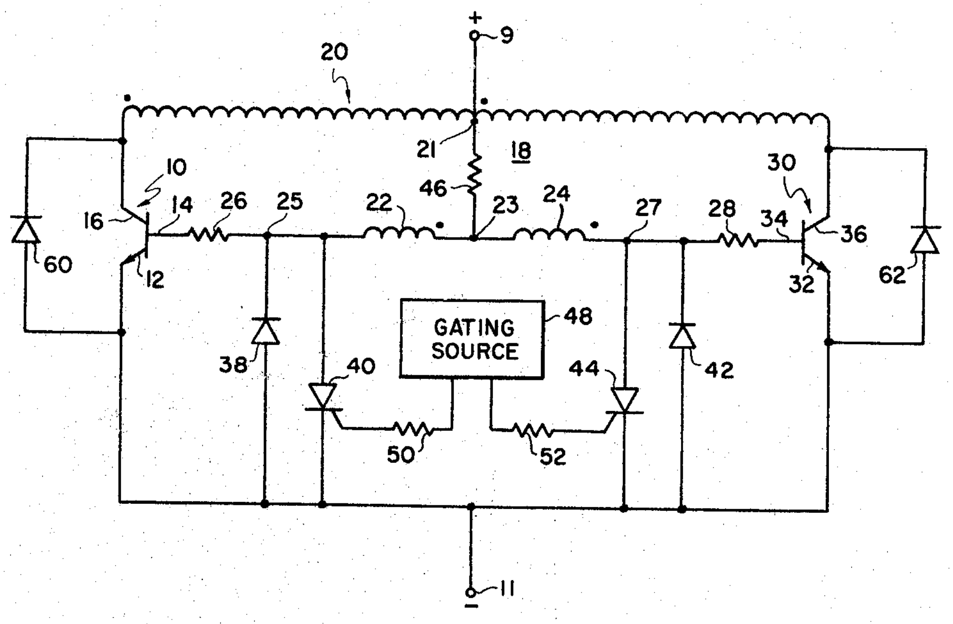
INVENTOR.
ARMISTEAD L. WELLFORD
BY Isidore Match
ATTORNEY 3,265,953
STATIC INVERTER
Armistead L. Wellford, Waynesboro, Va., assignor to General Electric Company, a corporation of New York
Filed Oct. 26, 1962, Ser. No. 233,211
10 Claims. (Cl. 321—45)

This invention relates to static inverters. More particularly, it relates to such inverters utilizing transistors as the power switching elements therein.

In the static inverter art, where high power applications are involved, the silicon controlled rectifier has been shown to be a rugged semiconductor switching element which can readily switch power from high unidirectional potential sources. However, in lower power ranges, transistors are available which can readily handle such lower ranges and can accordingly be utilized as the power switching devices in static inverters.

Transistor static inverters present many advantages over silicon control rectifier inverters in that they require no complex startup and undervoltage circuitry by virtue of their inherent natural commutating action, i.e., they block forward voltage whenever the drive to them is removed. As for the possibility that in static inverter circuits, overloads may be encountered at startup, it has been found that power handling transistors are able to withstand a few cycles of overload which may occur at startup without any damage thereto.

However, in transistor inverters, one of the disadvantages that has been presented by them heretofore is the need for auxiliary transistors to enable the handling of drive power because of the relatively low gain of individual transistors.

Accordingly, it is an important object of this invention to provide a substantially high power transistor inverter wherein only two transistors need be utilized.

It is a further object to provide an inverter in accordance with the preceding object utilizing a regenerative drive arrangement.

Generally speaking and in accordance with the invention, there is provided an arrangement for converting power from a unidirectional potential source to an alternating current power output comprising first and second transistors, means for supplying regenerative drive to the transistors coupled between the transistors and in circuit with the source and first and second gate controlled rectifiers in circuit with the regenerative drive means. The regenerative drive means effects conductivity in one of the transistors and nonconductivity in the other of the transistors concurrently. First and second gate controlled rectifiers are included, each being associated with a respective transistor. A pulse source is provided for gating the controlled rectifiers, gating causing one of the gate controlled rectifiers to be rendered conductive to short circuit the regenerative drive means therethrough and thereby to cause a switching of conductivity between the transistors.

The features of this invention which are believed to be new are set forth with particularity in the appended claims. The invention itself, however, may best be understood by reference to the following description when taken in conjunction with the accompanying drawing which shows an embodiment of a static inverter in accordance with the invention.

Referring now to the drawing, the emitters 12 and 32 of transistors 10 and 30 respectively are connected to the negative terminal 11 of a unidirectional potential source (not shown), the collectors 16 and 36 being interconnected by the primary winding 20 of a transformer 18, the midpoint 21 of primary winding 20 being connected to the positive terminal 9 of the unidirectional potential source. The bases 14 and 34 of transistors 10 and 30 respectively are interconnected by the series arrangement of a resistor 26, secondary windings 22 and 24 of transformer 18 and a resistor 28. The junction 25 of resistor 26 and secondary winding 22 is connected to negative terminal 11 through the cathode to anode path of a diode 38 and is also connected to negative terminal 11 through the anode to cathode path of a silicon controlled rectifier 40. The junction 27 of secondary winding 24 and resistor 28 is connected to negative terminal 11 through the cathode to anode path of a diode 42 and is also connected to negative terminal 11 through the anode to cathode path of a silicon controlled rectifier 44. A resistor 46 is included connected between the junction 23 of secondary windings 22 and 24 and midpoint 21.

A gating source 48 which may suitably be a unijunction transistor relaxation oscillator such as shown on page 122 of the Silicon Controlled Rectifier Manual, Second Edition, published by the General Electric Company, supplies gating pulses to silicon controlled rectifiers 40 and 44 through current limiting resistors 50 and 52 respectively.

The operation of the circuit is first described as if gating source 48, silicon controlled rectifiers 40 and 44 and resistors 50 and 52 were not included therein. In such assumed circuit, transformer 18 would, of necessity, be of the saturable type. In this assumed circuit, because of the presence of resistor 46, both transistors 10 and 30 would be biased in a direction to initially render them both conducting whereby resistor 46 would insure self-saturating of the circuit at startup. However, although transistors 10 and 30 might be so biased, any small unbalance would cause one transistor to conduct before the other. If it were assumed that transistor 30 where the first to conduct, the polarity at the dot terminal of secondary winding 24 would be such that when transistor 30 would so conduct, the negative voltage applied at junction 23 would induce a positive voltage at the dot terminal of secondary winding 24 thereby increasing the conductivity in transistor 30. Transistor 30 would remain conductive until transformer 18 would saturate a constant number of volt-seconds later, such time of saturation being determined by the volt-second characteristic of transformer 18, viz., core area, winding turns number, and saturation flux density. While transistor 30 would be biased in the conductive direction, the reverse polarity occurring in secondary winding 22 would be biasing transistor 10 further in the nonconductive direction. Thus, transistor 30, while conductive, would be supplied with base drive from secondary winding 24 through resistor 28, the base to emitter diode of transistor 30, and the anode to cathode path of diode 38 to junction 25. The forward voltage drop of diode 38 would supply negative bias to transistor 10 through resistor 26 thereby maintaining it in the nonconductive state.

Now, when saturable transformer 18 would saturate after transistor 30 had been conductive, the voltage on the windings of transformer 18 would collapse thereby removing base drive from transistor 30. This act of collapsing which is the moving down of the operating point of the transformer on its hysteresis loop would initiate regeneration in the opposite direction and consequently transistor 10 would be substantially immediately rendered conductive and transistor 30 would be concurrently biased into nonconductivity. It is thus seen that the windings of transformer 18 are so poled as to provide positive feedback from the collector circuits to the base inputs of transistors 10 and 30 until windings 22 and 24 are effectively short circuited, either by the self saturation action of transformer 18 or by the alternate gating "ON" of gate controlled rectifiers 40 and 44. Accordingly, the voltage generated across windings 22 and 24 due to the alternate build-up and collapse of the current therein provides regenerative drive to effect the switching of conductivity between transistors 10 and 30.

Considering now the operation of the circuit as shown in the drawing, i.e., with the inclusion of gating source 48, resistors 50 and 52 and silicon controlled rectifiers 40 and 44, let it be assumed that at the startup of the circuit, transistor 30 is the first to conduct and that transformer 18 is of the saturable type. Transformer 18 in this situation proceeds towards saturation in one direction. However, before the time required for transformer 18 to saturate elapses, gating pulses are supplied to silicon controlled rectifiers 40 and 44. With transistor 30 conducting, silicon controlled rectifier 44 is rendered conductive due to the positive polarity of the voltages at the dot terminals of windings 22 and 24 and, consequently, windings 22 and 24 are short circuited through silicon controlled rectifier 44 and diode 38. This action causes the voltages on the windings of transformer 18 and consequently the base drive to transistor 30 to collapse. Concomitantly, regeneration is initiated in the opposite direction to render transistor 10 conductive and bias transistor 30 into nonconductivity whereby transistor 10 now conducts until the next pulse from gating source 48 is applied to the gate electrodes of silicon controlled rectifiers 40 and 44. At such time, windings 22 and 24 are short circuited through silicon controlled rectifier 40 and diode 42. Of course, when conductivity switches, for example, from transistor 30 to transistor 10, the polarities of the voltages at the terminals of the windings of transformer 18 reverse and silicon controlled rectifier 44 is reverse biased by the forward drop of diode 42 which is now handling the drive current through transistor 10, resistor 26 and secondary windings 22 and 24.

For the desired operation of the circuit, the pulse repetition frequency of the output of the gating source 48 is chosen to be greater than twice what would be the "natural" frequency of the circuit in the absence of silicon controlled rectifiers 40 and 44 if transformer 18 is chosen to be of the saturable type. However, it is seen that transformer 18 need not be of the saturable type since the switching of conductivity between the transistors is effected by the regenerative action caused by the gating of silicon controlled rectifiers 40 and 44 respectively. Of course, if transformer 18 is not chosen to be of the saturable type, then no lower limit need be imposed on the frequency of the output of gating source 48. The output frequency of the circuit is, of course, equal to one half of the output frequency of gating source 48.

Transistors 10 and 30 have been shown in the drawing to be of the NPN type. However, transistors of the PNP type can be utilized just as readily. In the latter situation, a resistor could be advantageously inserted between junction 23 and negative terminal 11 to insure startup.

It is accordingly seen that with the circuit of the invention, regenerative drive is utilized and, accordingly, the relatively low gain of transistors 10 and 30 presents no problem and no auxiliary transistors need be utilized to handle the drive power. As for the silicon controlled rectifiers in the circuit, they respectively merely handle a short, albeit, high pulse of current. With a low duty cycle, the current handled by the silicon controlled rectifiers is of a small average value. Consequently, small silicon controlled rectifiers can be used, and with them, of course, no drive problems exist as would be the case wherein the transistors had to handle such heavy drive pulses.

The anode to cathode paths of diodes 60 and 62 are connected between emitter 12 and collector 16 of transistor 10 and emitter 32 and collector 36 of transistor 30 respectively. These diodes function as so-called "pump-back" diodes, i.e., they provide current paths for returning power to the source immediately after transistor turnoff when the load is of the lagging power factor type, i.e., inductive. Thus, for example, if it were assumed that transistor 30 were conducting, current consequently would flow from junction 21 to the non-dot terminal of the right half of primary winding 20. Now, when transistor 30 would be rendered nonconductive and the circuit load is inductive, current would be forced by the circuit inductance to flow in the same direction in the right half of primary winding 20 but it would flow up through diode 60 through the left half of primary winding 20 and back into the D.C. source. Such conduction in diode 60 ties the left end of winding 20 to negative terminal 11 forcing the polarities on the terminals of the windings of transformer 18 to reverse.

It is to be noted that transistors 10 and 30 in the circuit may be replaced by gate controlled rectifiers which can both be rendered conductive and nonconductive by gate control. If such replacement is made, then the circuit of the invention can be utilized in even higher power applications without the need of complex auxiliary startup and commutating schemes.

While there has been shown a particular embodiment of this invention, it will, of course, be understood that it is not wished to be limited thereto since different modifications may be made both in the circuit arrangements and the instrumentalities employed and it is contemplated in the appended claims to cover any such modifications as fall within the ture spirit and scope of the invention.

What is claimed as new and desired to be secured by Letters Patent of the United States is:

1. Apparatus for converting power from a unidirectional potential source to an alternating current power output, comprising, input means for applying a unidirectional potential to said apparatus, said input means including a pair of input terminals, first and second transistors each having emitter, base and collector terminals, means for supplying regenerative drive to said transistors, said regenerative drive means interconnecting said input terminals and the base to emitter paths of said first and second transistors and interconnecting said collector terminals to one of said input terminals said regenerative drive means being operative to alternately provide a first driving circuit comprising the base to emitter path of said first transistor and a second driving circuit comprising the base to emitter path of said second transistor to concurrently effect conductivity in one of said transistors and nonconductivity in the other of said transistors, first and second gate controlled rectifiers having their anode to cathode paths connected across the output of said regenerative drive means to each of said transistors respectively, and a pulse source coupled to said gate controlled rectifiers, the application of pulses from said pulse source to said gate controlled rectifiers alternately causing one of said gate controlled rectifiers to be rendered conductive to short circuit said drive means therethrough and thereby to cause a switching of conductivity between said transistors.

2. Apparatus for converting power from a unidirectional potential source to an alternating current power output comprising, input means for applying a unidirectional potential to said apparatus, said input means including a pair of input terminals, first and second transistors having base, emitter and collector electrodes, transformer means for applying the power from said unidirectional potential source to said transistors, said transformer means comprising first and second windings, said first winding having a pair of end terminals and an intermediate position terminal, said intermediate position terminal being connected to one of said input means terminals and having said first winding end terminals interconnecting said transistor collector electrodes said transistor emitter electrodes being connected to the other of said input means terminals, said second winding having a pair of end terminals and being operative to apply drive to said transistors, one of said second winding end terminals being connected to the input of one of said transistors and the other of said second winding end terminals being connected to the input of said second transistor, first and second gate controlled rectifiers connected between said other input means terminals and said second winding end terminals respectively, and a pulse source coupled to said gate controlled rectifiers, the application of pulses from said pulse source to said gate controlled rectifiers alternately causing one of said gate controlled rectifiers to be rendered conductive to short circuit said second winding therethrough and thereby to cause a switching of conductivity between said transistors.

3. Apparatus as defined in claim 2 wherein said intermediate position terminal is located at the midpoint of said first winding and said second winding end terminals interconnect the bases of said transistors.

4. Apparatus as defined in claim 3 and further including first and second means for maintaining one of said transistors nonconductive while the other transistor is conductive, comprising first and second diodes connected across said first and second gate controlled rectifiers respectively.

5. Apparatus as defined in claim 4 and further including biasing means connected between said one input means terminal and said first and second transistor bases respectively to operatively bias both of said transistors in their conductive regions.

6. Apparatus as defined in claim 5 and further including third and fourth pumpback diodes connected between the other of said input means terminal and said first winding end terminals respectively.

7. Apparatus for converting power from a unidirection potential source to an alternating current power output comprising first and second input terminals, first and second transistors, each of said transistors including an emitter, a base and a collector, a transformer including a tapped primary winding and a tapped secondary winding, means connecting one end of said primary winding to the collector of said first transistor and means connecting the other end of said primary winding to the collector of said second transistor, means connecting one end of said secondary winding to the base of said first transistor and further means connecting the other end of said secondary winding to said base of said second transistor, said primary and secondary windings being phased to provide feedback between said bases and collectors of said respective transistors, said emitters of said first and second transistors being connected to said first input terminal and said tapped primary being connected at its tap to said second input terminal and through a resistor to said tap of said secondary winding.

8. Apparatus as defined in claim 7 and further including a pair of pumpback diodes connected across the emitter to collector terminals of said transistors respectively.

9. Apparatus as defined in claim 7 and further including first and second gate controlled rectifiers connected between said first input terminal and said secondary winding ends respectively, and a pulse source coupled to said gate controlled rectifiers, the application of pulses from said pulse source to said gate controlled rectifiers alternately causing one of said gate controlled rectifiers to be rendered conductive to short circuit said secondary winding therethrough and thereby to cause a switching of conductivity between said transistors.

10. Apparatus as defined in claim 7 and further including a pair of pumpback diodes connected across the emitter to collector terminals of said transistors respectively, first and second gate controlled rectifiers connected between said first input terminal and said secondary winding ends respectively, and a pulse source coupled to said gate controlled rectifiers, the application of pulses from said pulse source to said gate controlled rectifiers alternately causing one of said gate controlled rectifiers to be rendered conductive to short circuit said secondary winding therethrough and thereby to cause a switching of conductivity between said transistors.

References Cited by the Examiner

UNITED STATES PATENTS

| | | | |
|---|---|---|---|
| 3,048,764 | 8/1962 | Murphy | 321—45 |
| 3,081,437 | 3/1963 | Radcliffe | 321—45 |
| 3,085,190 | 4/1963 | Kearns et al. | |

JOHN F. COUCH, *Primary Examiner.*

LLOYD McCOLLUM, *Examiner.*

J. M. THOMSON, W. M. SHOOP, *Assistant Examiners.*